United States Patent [19]
DeAngelis et al.

[11] Patent Number: 6,009,185
[45] Date of Patent: *Dec. 28, 1999

[54] NEURAL NETWORK BASED CONTACT STATE ESTIMATOR

[75] Inventors: Christopher M. DeAngelis, Cranston, R.I.; Robert W. Green, Harwich, Mass.

[73] Assignee: The United States of America as represented by the Secretary of the Navy, Washington, D.C.

[*] Notice: This patent is subject to a terminal disclaimer.

[21] Appl. No.: 08/646,416

[22] Filed: May 7, 1996

[51] Int. Cl.$^6$ ...................................................... G06K 9/00
[52] U.S. Cl. ........................................... 382/107; 367/131
[58] Field of Search .................................. 342/47, 95, 191, 342/195; 364/460; 367/87, 99, 118, 124, 127, 129, 131, 135, 907, 89, 91, 125; 382/103, 106, 107, 104, 100, 153, 154, 291; 395/21, 22; 116/27, 35 R

[56] References Cited

U.S. PATENT DOCUMENTS 5,488,589  1/1996  DeAngelis ............................... 367/131

OTHER PUBLICATIONS

C.M. DeAngelis and R.W. Green, Constructing Neural Networks for Contact Tracking, Neural Networks for Signal Processing II. Proceedings of the IEEE–SP Workshop, pp. 560–569, 1992.

C.M. DeAngelis and R.W. Green, Source Localization Using a Non–Traditional Three–Dimensional Ocean Modeler, Oceans '93. Engineering in Harmony with Ocean Proceedings, pp. 224–228, 1993.

*Primary Examiner*—Jon Chang
*Assistant Examiner*—Jayanti K. Patel
*Attorney, Agent, or Firm*—Michael J. McGowan; Prithvi C. Lall; Robert W. Gauthier

[57] ABSTRACT

A method is described for providing an estimate of the state of a stationary or moving contact in a three dimensional ocean. The method comprises the steps of collecting information about a location of an observer during a sequence of time, information from at least one sensor about a position of the contact relative to the observer during the time sequence, and a knowledge vector. Transforming the information into a series of three dimensional geographical grids. Examining the grids to identify hypothesized contact paths and analyzing the hypothesized contact paths to produce an estimate of the state of the contact with respect to the location of the observer. A device for providing the estimate of the state of a stationary or moving contact includes a grid stimulation block for transforming the collected information into the three dimensional geographical grids. A fusion block where grids corresponding to similar time intervals are combined or fused. A correlation block for identifying possible contact paths and for producing path likelihood vectors and an estimation block for providing the estimate of the state of the moving contact. The device further includes a controller for providing knowledge to the aforementioned blocks.

9 Claims, 4 Drawing Sheets

NEURAL NETWORK BASED CONTACT STATE ESTIMATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

1. Field of the Invention

The present invention relates to a method for providing an estimate of the position, speed, and direction of travel of a contact or target and a system for performing said method.

2. Description of the Prior Art

Computer based technology has advanced to the point where artificial systems have been developed which simulate the operation of the human brain. These systems are known as neural networks. Typically, the systems use numerous nonlinear computational elements operating in parallel and arranged in patterns reminiscent of biological neural networks. Each computational element or neuron is connected via weights or synapses that are adapted during training to improve performance. Many of these systems exhibit self-learning by changing their synaptic weights until the correct output is achieved in response to a particular input. As a consequence, these systems have lent themselves to use in a number of different applications.

One such application is target imaging and identification systems. U.S. Pat. No. 4,995,088 to Farhat illustrates a data analysis system for such an application. Farhat's data analysis system comprises a first array for receiving input data comprising a plurality of neural elements for transmitting data signals and memory means for processing the data signals transmitted by the elements of the first array. The memory means has associatively stored therein in accordance with a Hebbian model of learning for neural networks, at least one quantized feature space classifier of a known data set. The system further comprises a second array having a plurality of neural elements for receiving the data signals processed by the memory matrix. The neural elements of the second array are operatively coupled in feedback with the neural elements of the first array wherein the neural elements of the second array provide feedback input for the neural elements of the first array. In a preferred embodiment of the Farhat system, the neural elements of the first array comprise light emitting elements and the neural elements of the second array photo-detectors.

A second application is contact state estimation. The general contact state estimation, or target motion analysis, problem is to estimate contact location and motion from all available information. This information may include available sensor readings, environmental data, contact kinematics, and historical data. A three dimensional ocean modeling method in conjunction with a data fusion technique must be employed in order to exploit all available information in ascertaining a contact's state.

In a broad sense, each sensor reading provides constraints on the contact state. If sufficient observations are available, and if assumptions are made about the contact motion (such as constant speed and heading), then the contact state may be constrained to a single solution. Due to uncertainty, or error, associated with physical sensor readings, contact state determination becomes a parameter estimation problem. Noisy sensor readings will preclude an exact solution for contact state; therefore, a method must be employed to determine the most likely state estimate.

U.S. Pat. No. 5,488,589 to DeAngelis describes a system and method for contact state estimation that incorporates three dimensional ocean modeling with a data fusion technique to exploit all available information in ascertaining a contact's state. However, in estimating the state of a moving contact, the system and method of the DeAngelis patent constrains the motion of a contact to a model in which the contact follows a course defined by a constant heading and a constant speed at a constant depth. Such a limitation reduces the accuracy of contact state estimates, particularly in an environment where a majority of the contacts are capable of travel at varying speeds, headings and depths.

Thus, what is needed is a method and device for contact state estimation that does not constrain the motion of the contact to a single model of constant motion, that does not require significant computational demands and that incorporates fusion of multiple sensor information and a-priori information.

SUMMARY OF THE INVENTION

Accordingly, it is an object of the present invention to provide an improved method for providing an estimate of the state of a contact or target.

It is a further object of the present invention to provide a method as above which yields improvements in execution speed, assessment of solution sensitivity, and potential for sensor fusion.

It is another object of the present invention to provide a method as above which does not constrain contact motion to one model.

A still further object of the present invention is to provide a system for performing the above method.

The foregoing objects and advantages are attained by the method and the system of the present invention.

The method of the present invention for providing an estimate of the state of a moving contact broadly comprises the steps of: collecting information about a location of an observer during a sequence of time, information from at least one sensor about a position of said contact relative to the observer during the time sequence, and a-priori knowledge; transforming the collected information into a series of three dimensional geographical grids; identifying possible contact paths through the geographical grids; and analyzing the contact paths to produce an estimate of the state of the contact with respect to the location of the observer.

The device for providing the estimate of the state of the moving contact is a neurally inspired contact estimation (NICE) device. The device includes a grid stimulation block where collected information is transformed into a series of three dimensional geographical grids, an information fusion block where grids corresponding to similar time intervals are combined or fused, a correlation block for identifying possible contact paths and for producing path likelihood vectors in response to contact motion models defining the hypothesized motions of a contact in traversing the contact paths, and an estimation block for providing said estimate of the state of the moving contact. The device further includes a controller for providing each of the aforesaid blocks with a-priori information and control parameters. In a preferred embodiment, the device comprises a computer suitably programmed to include the aforesaid functional blocks and to perform the method of the present invention.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DESCRIPTION OF THE PREFERRED EMBODIMENT

Figure 1:
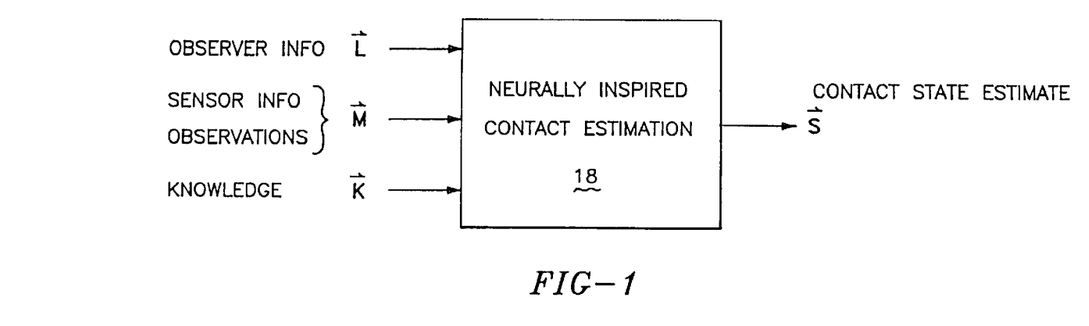
FIG. 1 is a schematic representation of the system of the present invention.

Referring now to the drawings, FIG. 1 broadly illustrates the system 18 of the present invention for providing an estimate of the state of a moving contact, such as an ocean-going body, relative to an observer. The system 18 is formed by a Neurally Inspired Contact Estimation (NICE) device. The current inventors provide a detailed description of the NICE architecture in papers authored by them entitled, "An Architected Neural Network For Contact State Estimation", *IEEE Proceedings of OCEANS* 92, vol. 1, pp. 153–157, and "Constructing Neural Networks For Contact Tracking", *Neural Networks For Signal Processing—Proceedings of the* 1992 *IEEE Workshop*.

As shown in FIG. 1, the inputs to system 18 are an observer information vector $\vec{L}$, a sensor information vector $\vec{M}$, and a knowledge vector $\vec{K}$. The observer information vector $\vec{L}$ contains the locations of the observer during a particular period of time having time intervals 1 to T. The sensor information vector $\vec{M}$ contains sensor data for the corresponding time periods. The sensor data may be generated by one or more sensors (not shown). If desired, the observer and the sensors may be located upon an observation platform such as a ship. The information in the vector $\vec{M}$ may include: location of contact relative to the observer, bearing angle, or the like. The information contained in the observer information vector $\vec{L}$ and the sensor information vector $\vec{M}$ can be collected using techniques known in the art such as deploying towed arrays, unmanned underwater vehicles, or similar sonar systems.

The knowledge vector $\vec{K}$, contains a-priori knowledge which may include: environmental data such as a sound velocity profile or sound propagation characteristics; sensor characteristics such as measurement error, confidence in the sensor, and modeling anomalies; contact kinematics such as maximum speed and depth, maximum acceleration and deceleration rates, maximum change in depth rates and maximum turn rate; historical data such as previous state estimates, typical or anticipated contact maneuvers, or possible containment regions for a contact; contact classification data; or the like. It is through the knowledge vector $\vec{K}$ that the model created by the system 18 becomes an intelligent and adaptive three dimensional ocean based model for providing an estimate of the position, speed, depth and motion of a contact. The motion of a contact describes the velocity, including any acceleration, deceleration and changes therein; the heading, including any turns and the turn rate; and the depth, change in depth and rate of change, of the contact over time. The information vectors $\vec{L}$, $\vec{M}$ and $\vec{K}$ may be inputted into the device 18 using any suitable input means known in the art.

Figure 2:
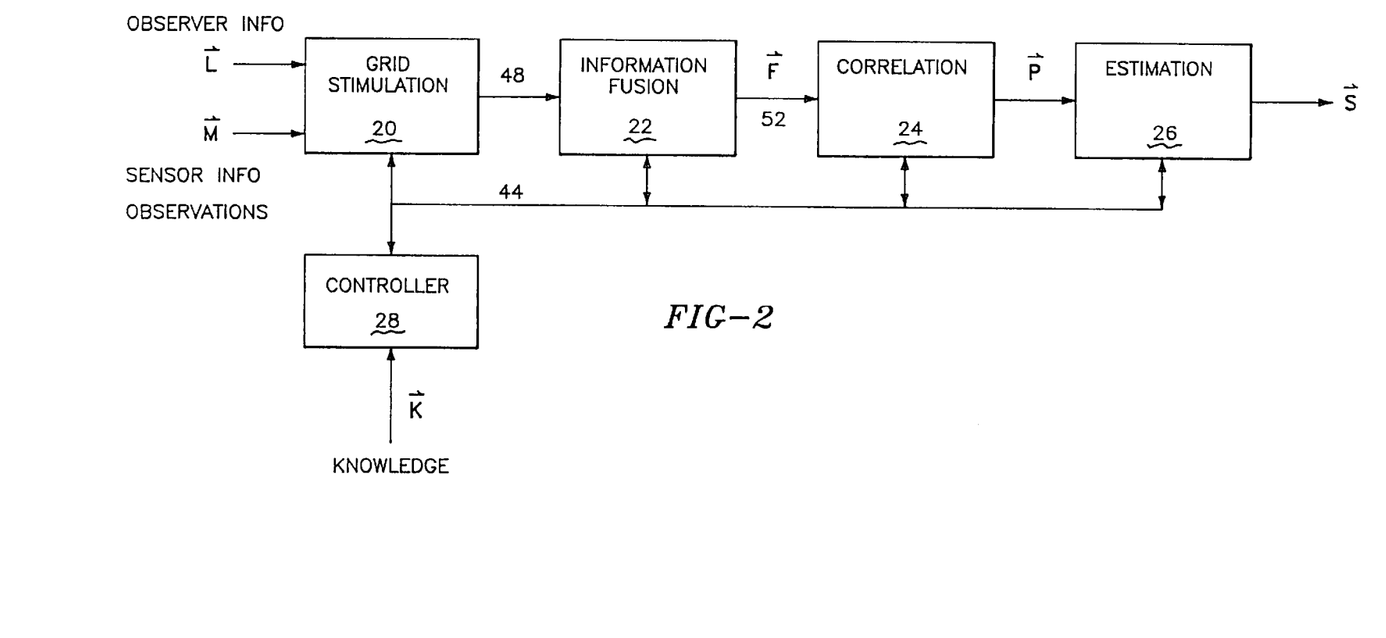
FIG. 2 is a block diagram of the system of the present invention illustrating a representation of the functional blocks within the device for providing the estimated contact state.

The system 18 produces an output vector $\vec{S}$ which contains an estimate of the contact state with respect to the observer's location. Typically, the contact state consists of one or more of: bearing from observer to contact, range from observer to contact, contact depth, contact course, contact speed, or the like for a respective moment in time. The output vector $\vec{S}$ may be displayed in any desired form. For example, the output vector may be a visual display on a screen or a written display on a chart or graph paper. The vector could take the form of marked boxes on a graph display which indicate an estimate of the course taken by the contact. As shown in FIG. 2, the system 18 is made up of four major functional blocks and a controller. The four major functional blocks are a grid stimulation block 20, an information fusion block 22, a correlation block 24 and an estimation block 26.

The grid stimulation block 20 transforms the observer and sensor information vectors $\vec{L}$ and $\vec{M}$ into a series of three dimensional geographical grids indicated by arrow 48. Preferably, one geographical grid is formed for each sensor reading. After the geographical grids have been formed and the information about them has been inputted into the block 22, information fusion is performed to combine geographical grids corresponding to similar time intervals into a set of consolidated grid representations $F_1 \ldots F_T$. A single consolidated grid representation $F_j$ is representative of available information for a respective time interval (or time plane). The vector $\vec{F}$ containing all consolidated grid representations indicated by the arrow 52 is then fed into the correlation block 24.

The correlation block 24 applies contact motion models, each defining a hypothesized motion of a contact in traversing a contact path to the consolidated grid representations. The contact motion model describes a course (heading), speed and depth of a contact as well as any changes made in the course, speed or depth of the contact as it moves. The output of the correlation block is a set of path likelihood vectors $P_1 \ldots P_I$. A single path likelihood vector $P_i$ containing a likelihood measure for each possible contact path is generated for each contact motion model. A possible contact path is defined as one from a geographical cell center in the first time plane to a cell center in the last time plane. The likelihood measure for a contact path indicates the likelihood that, given a contact motion model, a contact traversed that contact path. The vector $\vec{P} = [P_1 \ldots P_I]$ containing all the path likelihood vectors is then fed to the estimation block 26.

The estimation block 26 transforms the path likelihood vector $\vec{P}$ to a contact state estimate vector $\vec{S}$.

The controller 28 incorporates a-priori knowledge vector $\vec{K}$ into the four functional blocks described above. Various information is sent to each block through the connections 44. Furthermore, the controller monitors each block through the connections 44. In this way, the controller 28 may adjust parameters or knowledge accordingly to improve the state estimate vector $\vec{S}$.

Figures 3, 6:
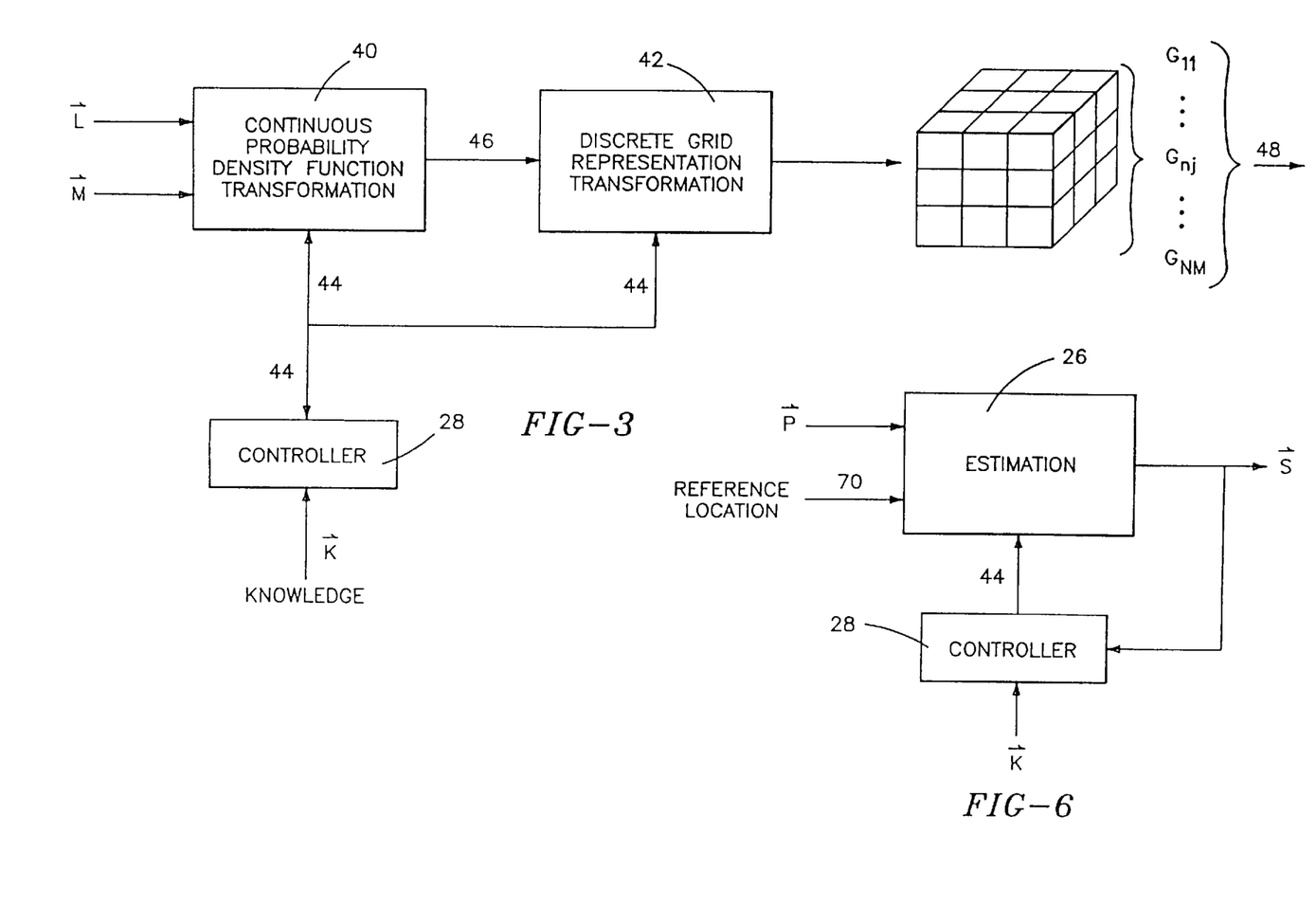
FIG. 3 is a schematic representation of the grid simulation block in the system of FIG. 2.
FIG. 6 is a schematic representation of the estimation block in the system of FIG. 2.

The grid stimulation block 20 shown in FIG. 3, transforms the information vectors $\vec{L}$ and $\vec{M}$ into a series of three dimensional geographical grids 48 using standard mathematical techniques. The stimulation block forms geographical grids ranging from grid $G_{11}$ to $G_{NM_n}$ where N is the number of sensors and $M_n$ is the number of measurements for a respective sensor n. The number of measurements $M_n$ for a sensor may be equal or less then the number of time intervals T. The designation $G_{nj}$ used in the figure refers to the geographical grid formed by sensor n for time interval j. This transformation is preferably formed in two stages. First, pairs of sensor observation and location information are formed. Each pair is then transformed in the block 40 into a three dimensional continuous probability density function 46 representing the likelihood of the contact's location over the respective time plane. The controller 28 incorporates through connections 44 three dimensional propagation characteristics, three dimensional sensor motion compensations, measurement confidence, and the like into this transformation. This is done to convert the pair information into the three dimensions that make up the actual environment. For example, due to temperature gradients sound does not travel in a straight path, rather it takes a curved path. This is valuable information used in forming an accurate probability density function. Furthermore, high measurement confidence also influences the form of the probability density function in that more weight or attention is given to regions along the measurement propagation path.

After all of the continuous probability density functions 46 have been determined, they are transformed in the block 42 into discrete values corresponding to stimulation levels for the cells in the three dimensional geographical grids $G_{nj}$. A grid's cells are stimulated in proportion to the likelihood of the contact's presence. For example, the probability of the contact being in a cell may be 0.55. In a simple system, the cell may be stimulated so that it has a value of "1" which indicates that there was a contact in that cell at that point in time. Alternatively, the probability of a contact being in a cell may be 0.40. In this case, in a simple system, the cell is stimulated so as to have a value of "0" which means that there was no contact in the cell at that point in time. The controller 28, in this instance, advises on a coordinate system to be used and a corresponding grid's resolution. The controller also analyzes the grids and makes any required adjustments to the controlling parameters. For example, the controller may adjust the number of rows or columns in the grids, or the number of layers in the neural net. Information about the three dimensional geographical grids 48 is then inputted into the information fusion block 22.

Figure 4:
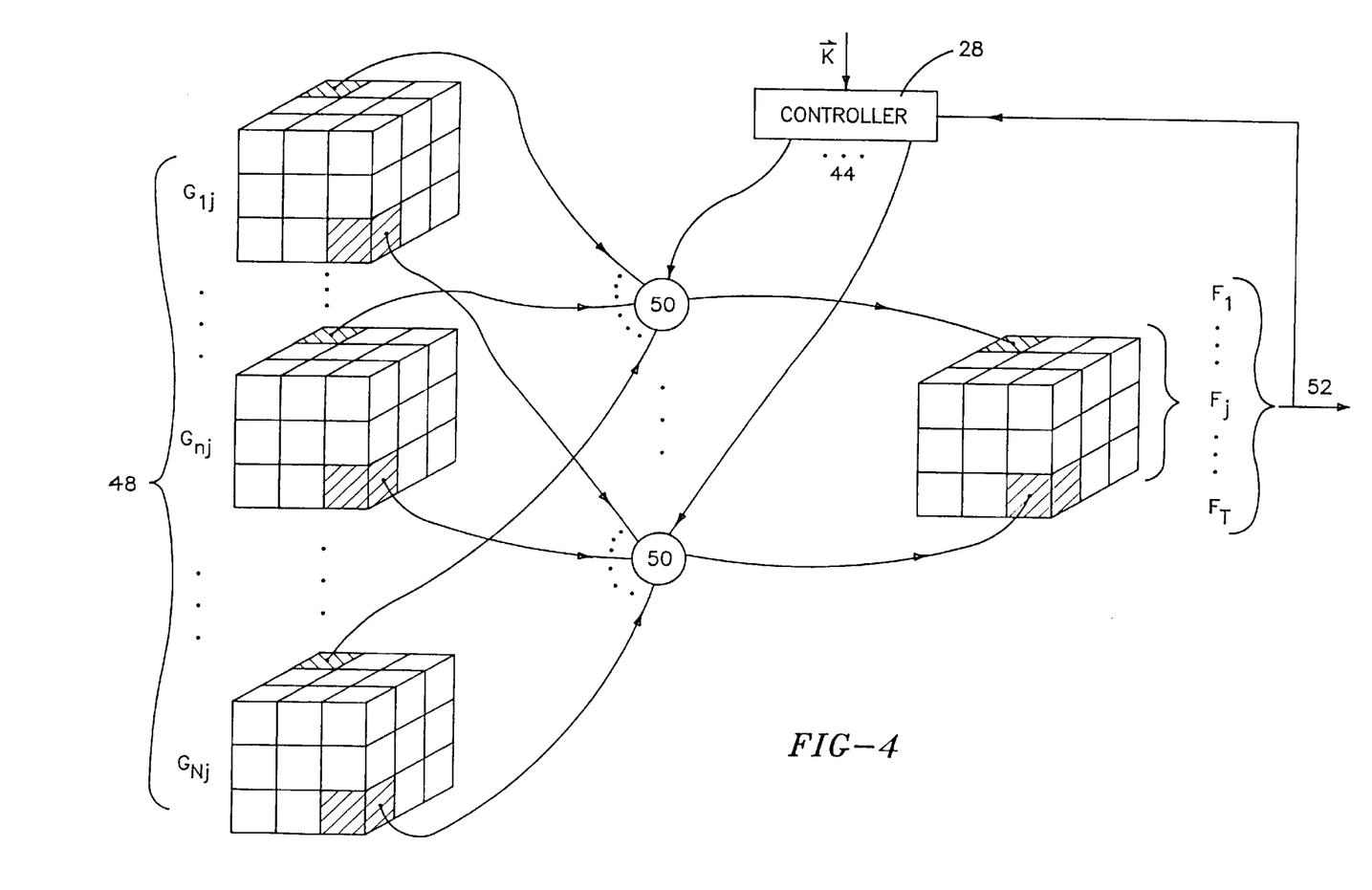
FIG. 4 is a schematic representation of the information fusion block in the system of FIG. 2.

The information fusion block 22 is illustrated in FIG. 4. In this block, the geographical grids 48 corresponding to equivalent time intervals are combined to form one or more fused geographical grids $F_j$ representative of information in the interval. The block 22 has a series of artificial neurons 50 that combine like regions from each sensor's grid based upon confidence on each sensor and taking into account contact motion and kinematic constraints such as maximum speed, maximum dive rate or the inability of a contact to traverse through a land mass. Sensor confidence knowledge may be inputted through the controller 28 which may, for example, instantaneously tell one or more of the neurons 50 to ignore information from certain sensors. Additionally, the neurons 50 may ignore information which is in contradiction to the given contact restraints.

The number of artificial neurons 50 in the block 22 depends upon the size of the geographical grids that are formed in the stimulation block and may be equal in number to the number of cells in the grids 48. Alternatively, the number of artificial neurons 50 may be dictated by the size of the fused grid representations to be formed.

The controller 28 through connections 44 is also used to excite or inhibit cell fusion according to a-priori knowledge in the formation of the fused grid. For example, the controller may be provided with certain knowledge about a sensor from an external source and may instruct the neurons 50 to ignore information from a sensor and/or weight other information accordingly. Still further, the controller 28 may shut off certain neurons based on external knowledge. As can be seen from this description, the controller 28 plays a dynamic role and provides an automatic control system for this functional block as well as the others.

Each fused geographical grid $F_1$ to $F_T$ formed by the information fusion block can be represented as a linear vector. The compilation of these vectors, $\vec{F}$, is the output 52 of the block 22.

Figure 5:
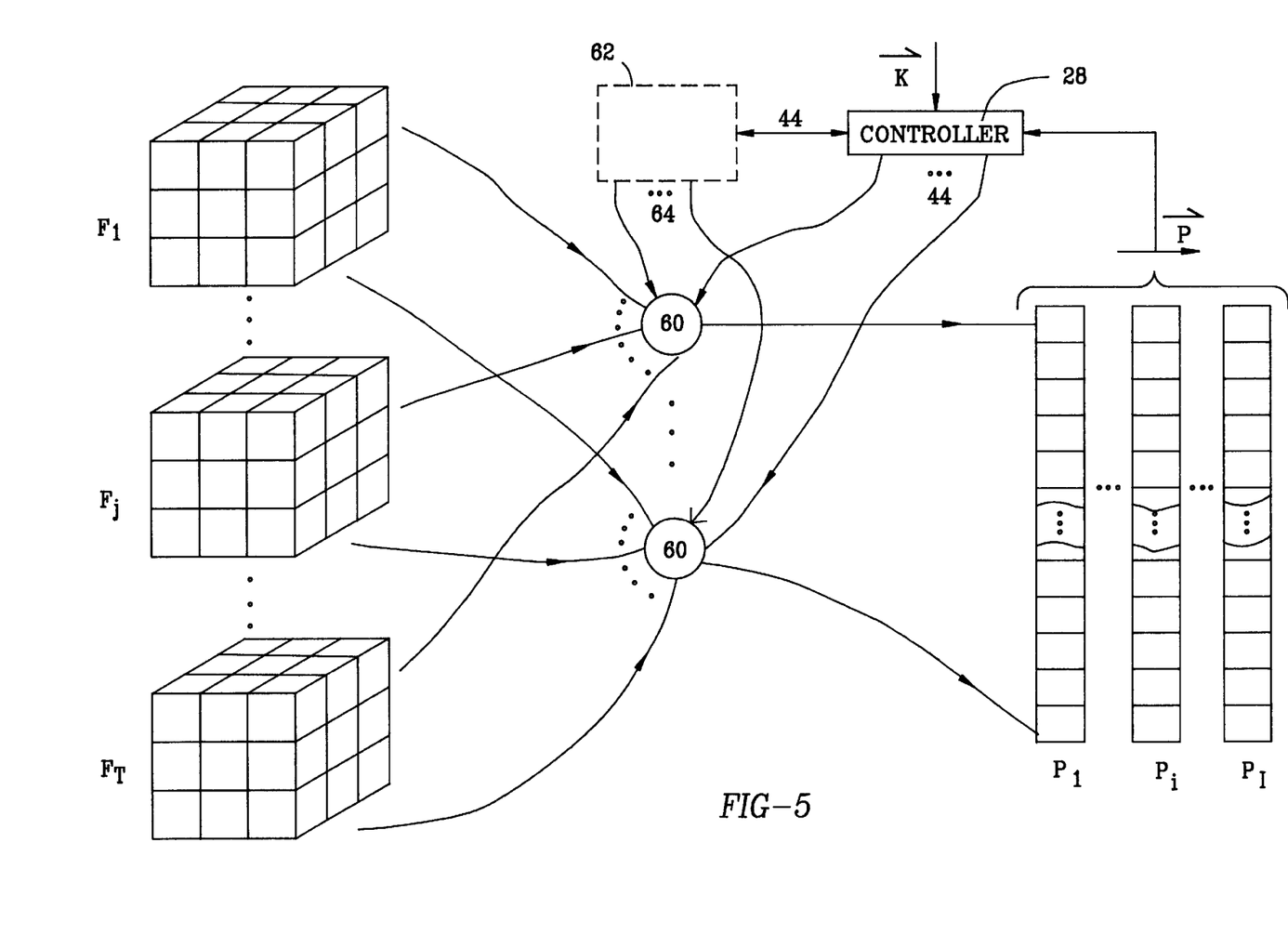
FIG. 5 is a schematic representation of the correlation block in the system of FIG. 2.

The correlation block 24 is illustrated in FIG. 5. As shown therein, the block 24 has a series of artificial neurons 60 that compute a measure of the likelihood that a particular contact path was taken by the contact. Theoretically, a single neuron is needed for each possible contact path. The set of all possible contact paths defined by the neurons comprises all possible paths between geographical cell centers starting in a grid corresponding to the first observation interval and ending in a grid corresponding to the last observation interval. If each geographical grid has a resolution of X cells per side, then each observation's corresponding grid contains $X^2$ cells. Since a contact path could begin and end in any one of the $X^2$ cells, there would be $X^4$ possible contact paths. For X=256, the number of possible paths is I=$256^4$, or over 4 billion. This number of possible paths assumes that only one motion model exists for traversing each path. That is, the motion is constrained to a single identifiable model such as a constant heading, speed and depth. Allowing for multiple motion models would require $256^4$ possible paths for each motion model.

Setting aside storage for a single neuron for each possible contact path is prohibitive. Allowing the motion of a contact to vary only increases the number of neurons needed. Although restrictions on contact kinematics will reduce the number of possible contact paths and limits the motion of a contact, a large number of contact paths will still remain. Additionally, it may not be possible to identify all paths or types of motion to eliminate until after the geographical grids $G_{nj}$ or the consolidated grid representations $F_j$ are built. Furthermore, it is only necessary to generate and evaluate contact paths which have both the corresponding first and last observation cells active. Therefore, neurons are only created as needed.

Correlation block 24 generates one neuron for each identified contact path. Each neuron 60 generated corresponds to a particular contact path having both the corresponding first and last observation cells active and has one input from each fused geographical grid vector $F_1$ through $F_T$. For example, assuming that six cells in a grid corresponding to the first observation time are active and five cells in a grid corresponding to the last observation time are active, correlation block 24 would generate thirty neurons. One neuron for each pair of cells in which one cell is from the grid corresponding to the first observation time and one cell is from the grid corresponding to the last observation time.

The input to a neuron from each of the intermediate fused geographical grids $F_j$ is from the vector entry which corresponds to the geographical cell containing the location of the contact at the time of the observation, assuming the contact traverses the contact path as defined by the respective contact motion model. Correlation block 24 selects the cells for connection to each neuron 60 based on the motion model applied to each respective neuron 60. The contact motion models can be generated by controller 28 and fed to neurons 60 through connections 44. Preferably, the contact motion models are stored in or generated by a contact motion modeler 62 and fed to neurons 60 through connections 64.

The contact motion models describe a hypothesized motion of a contact in traversing the contact path. Every contact path can be identified by a pair of (X,Y,Z) coordinates. The coordinates can be thought of as latitude, longitude and depth coordinates. The coordinates correspond to, and can be used to uniquely identify, cells within the geographical grids $G_{nj}$ or the consolidated grid representations $F_j$. Thus, one set of (X,Y,Z) coordinates identifies the first observation cell and one set identifies the last observation cell. The motion between these two cells can be described in terms of the (X,Y,Z) coordinates using $\dot{X}$, $\dot{Y}$ and $\dot{Z}$ to define the rate of change in the X, Y, and Z directions, respectively, and $\ddot{X}$, $\ddot{Y}$ and $\ddot{Z}$ to define the rate of change of $\dot{X}$, $\dot{Y}$ and $\dot{Z}$, respectively. That is, for motion in one-dimension, X is a position, $\dot{X}$ is the rate of change in position (i.e., velocity) and $\ddot{X}$ is the rate of change in velocity (i.e., acceleration). The contact motion models can be used to describe a variety of types of motion such as following a constant heading and accelerating at a rate A1 while surfacing at a constant rate, executing a two-degree turn to the right and traveling at a speed S1 at a constant depth D1, turning at a rate of X° per 100 meters while accelerating at a rate A2, or the like.

In addition, the contact motion models can also be used to describe the motion of a stationary contact. The contact can be stationary, that is moving less than can be perceived within the accuracy of the sensors, through the entire sequence of consolidated grids or through some subset of the consolidated grids. As is obvious to those skilled in the art, the motion of a stationary contact is described by setting the values of $\dot{X}$, $\dot{Y}$ and $\dot{Z}$ and $\ddot{X}$, $\ddot{Y}$ and $\ddot{Z}$ to zero.

Preferably, each neuron 60 is fed the same contact motion model. That is, the contact motion models apply uniform motion constraints across each of the hypothesized paths. Requiring that each contact path be traversed in the same manner produces one path likelihood vector $P_i$ for each contact motion model. Using a single vector $P_i$ for each model eliminates the need to include information identifying the contact motion model used to produce the likelihood measure for each contact path in the vector. Additionally, using a single motion model for each vector $P_i$ simplifies the processing in the estimation block 26.

For each contact motion model applied, a likelihood measure for each possible contact path is generated. Each neuron acts as an evidential combiner; its inputs represent compliance between a hypothesized contact path, determined by the contact motion model, and the sensor observations at specific times, and its output represents the overall path likelihood. In their simplest form, the correlation neurons 60 are Boolean AND gates. With each neuron 60 acting as a Boolean AND gate, each input from a fused cell to a neuron must be active. With such an implementation, the output of each neuron is Boolean as well. That is, the likelihood value is 1 if each input is active and 0 otherwise.

In a more robust implementation, neurons 60 respond proportionally to the degree of compliance for a respective traversal across the grids. With such an implementation, only a percentage of the inputs to the neuron need to be active. Additionally, the inputs form cells which are not active can be weighted based on the distance to the nearest active cell in the corresponding fused grid or in an adjacent fused grid. The output of a robust implementation can be Boolean with the likelihood value being 1 if the percentage of active inputs is above a threshold and 0 otherwise. Alternatively, the likelihood value can be a real-valued number proportional to the compliance of the active inputs for the respective traversal across a contact path. That is, the output could be 0.90 if between 88 and 93 percent of the inputs were active. Additionally, the likelihood values may be based on the percentage of active inputs as well as any weighted inputs, such as those inputs which are not active but have an active cell within a certain number of cells.

The controller 28 through connections 44 excites or inhibits the correlation neurons according to a-priori knowledge and this influences the formation of each path likelihood vector $P_i$ (the vector of neuron outputs). This knowledge may include maximum speed and depth, depth change characteristics, or the like. For example, the controller 28 may turn off certain neurons 60 based on the knowledge that a particular path was not possible because it required the contact to dive to deep or required he contact to dive when sensors indicate that the contact is surfacing.

The estimation block 26 is illustrated in FIG. 6. Its inputs are the path likelihood vector $\vec{P}$ produced by the correlation block and a reference location 70. The function of this block is to transform the path likelihoods into a contact state estimate vector $\vec{S}$ with respect to the reference location 70 using an appropriate averaging method such as a mean, median, peak value, or the like. The controller 28 through connection 44 advises this block on an averaging method to be employed in the block and provides constraints to be placed on the estimate. These constraints may include: maximum speed, maximum depth, or the like. The controller 28 also monitors the estimates and makes appropriate parameter changes throughout the system. For example, if the variance of an estimate is too high, the controller may tell the estimation block to ignore certain path likelihoods. Also, the controller 28 may update the sizes of the geographical grids and the fused grid representations depending upon what it is "seeing". The controller 28 may instruct correlation block 24 to form new contact motion models based on the results of the estimation block 26. Still further, the controller may instruct the estimation block 26 to change the averaging method being used.

As can be seen from the foregoing discussion, the controller 28 takes certain a-priori knowledge and provides guidance to each of the functional blocks making up the system 18. It also monitors each block and updates system parameters accordingly. This allows for a feedback mechanism to fine tune the state estimate $\vec{S}$ and fully exploit all available information.

The system 18 described herein may be implemented in hardware using standard electronic components to form the circuits for performing the functions in the various functional blocks; however, it is preferred to implement the system using a computer and software which carries out the aforementioned functions. The software may be in any desired language and may use standard mathematical techniques to perform the functions described herein. A software implementation is preferred due to the number of cells and connections required and the limitations of current VLSI circuit densities.

In operation, an estimate of the state of a moving contact is provided by inputting into a device such as a programmed computer information about a location of an observer during a sequence of time, information from at least one sensor about a position of the contact relative to an observer during the sequence of time, and a-priori knowledge information. The inputted information is then transformed into a series of geographical grids with each grid having a plurality of cells. The geographical grids so produced are then analyzed to produce an estimate of the state of the contact with respect to a location of an observer. The analysis comprises combining grids corresponding to similar time intervals into a series of consolidated grid representations. Thereafter, possible contact paths are identified by first and last cells and contact motion models are applied to the consolidated grid representations to generate a possible traversals across the grids. A path likelihood vector is produced for each contact motion model applied. Finally, the path likelihood vectors are transformed into the estimate of the contact state. The functional blocks for performing the steps described herein are discussed above.

The major advantages of the system and the method of the present invention over those known in the prior art include: the ability to perform three dimensional ocean modeling, sensor fusion, and an assessment of solution sensitivity. In addition, a mechanism is provided to incorporate knowledge such as environmental data, contact kinematics and historical data. Furthermore, the inclusion of a feedback path allows for the fine tuning of the state estimate. Overall, a three dimensional ocean modeling method in conjunction with a data fusion technique, and a controller are employed in order to exploit all available information in ascertaining a contact's state.

While a rectangular coordinate system has been described in forming the geographical grids, it is possible to perform the present invention using a polar coordinate system where each cell represents a (range, angle, depth) triplet where range is the distance from observer to contact, angle is a bearing in the horizontal plane, and depth is a bearing in a vertical plane.

It is apparent that there has been provided in accordance with this invention a neural network based three dimensional ocean modeler which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A method for providing an estimate of the state of a contact comprising the steps of:
    collecting information about a location of an observer during a sequence of time, information from at least one sensor about a position of said moving contact relative to said observer during said sequence of time, and a-priori knowledge;
    transforming the collected information into a series of three dimensional geographical grids with each grid having a plurality of cells;
    stimulating said cells in said geographical grids in proportion to the likelihood of a contact's presence;
    fusing said geographical grids with said stimulated cells so that grids corresponding to similar time intervals are combined into a series of consolidated grid representations;
    forming a plurality of contact paths, wherein each contact path in said plurality of contact paths is defined by a unique pair of said stimulated cells and wherein one cell in said pair identifies an initial contact location and one cell in said pair identifies a final contact location; and
    analyzing said contact paths to produce an estimate of the state of the contact with respect to the location of the observer wherein said analyzing step comprises applying a plurality of contact motion models to each contact path in said plurality of contact paths, wherein each of said contact motion models defines a unique motion for traversing a contact path and wherein said motion is defined by velocity, rate of change in said velocity, heading, rate of change of said heading, change in depth, and rate of change of said change in depth of said contact over time; producing a path likelihood vector for each contact motion model applied to said plurality of contact paths, each path likelihood vector containing a likelihood measure for each contact path; and transforming the set of path likelihood vectors into said estimate of the contact state, wherein said estimate of the contact state provides an estimate of position, speed, depth and said motion of said contact at any moment during said sequence of time.

2. The method of claim 1 wherein said pair of stimulated cells are selected from a first and a second consolidated grid within said series of consolidated grid representations, wherein said first consolidated grid corresponds to a first time interval and said second consolidated grid corresponding to a second time interval different from said first time interval.

3. The method of claim 1 further comprising supplying said a-priori knowledge to said transforming step, said stimulating step, said fusing step, said identifying step and said analyzing step.

4. The method of claim 3 further comprising:
    monitoring said transforming step, said stimulating step, said fusing step, said identifying step and said analyzing step; and
    adjusting parameters within at least one step of said stimulating step, said fusing step, said identifying step and said analyzing step.

5. The method of claim 1 wherein said transforming step comprises:
    forming observation and location pairs for each sensor;
    transforming said pairs into three dimensional continuous probability density functions representing the likelihood of the contact's location over the respective time plane;
    incorporating at least one of three dimensional sound propagation characteristics, three dimensional sensor motion compensations, and measurement confidence into said probability density functions; and
    transforming said three dimensional continuous probability density functions into discrete values corresponding to stimulation levels for the cells in said geographical grids.

6. A system for providing an estimate of the state of a contact comprising:
    means for collecting information about a location of an observer during a sequence of time and information from at least one sensor about a position of said contact relative to said observer;

means, coupled to said means for collecting, for transforming said observer and said location information into a series of three dimensional geographical grids with each grid having a plurality of cells;

means, coupled to receive said series of three dimensional geographical grids, for forming a plurality of contact paths from pairs of said cells;

means, connected to said means for forming contact paths, for analyzing said contact paths to produce an estimate of the state of the contact with respect to the location of the observer; wherein said means for analyzing comprises a correlator for applying a plurality of contact motion models to each contact path in said plurality of contact paths, wherein each of said contact motion models defines a unique motion for traversing a contact path and wherein said motion defines velocity, rate of change in said velocity, heading, rate of change of said heading, change in depth, and rate of change of said change in depth of said contact over time, and for producing a path likelihood vector for each contact motion model applied to said plurality of contact paths, each path likelihood vector containing a likelihood measure for each contact path, and wherein said estimate of the contact state provides an estimate of position, speed, depth and said motion of said contact at any moment during said sequence of time; and means, coupled to said means for transforming, to said means for forming and to said means for analyzing, for providing a-priori knowledge to said means for transforming, to said means for forming and to said means for analyzing.

7. The system of claim 6 said means for forming contact paths further comprises:

means for stimulating said cells in said geographical grids in proportion to the likelihood of a contact's presence;

means for fusing said geographical grids with said stimulated cells so that grids corresponding to similar time intervals are combined into a series of consolidated grid representations; and means for identifying at least one pair of said stimulated cells, wherein said means for identifying selects at least one pair of stimulated from first and second consolidated grids wherein said first consolidated grid corresponds to a first time interval and said second consolidated grid corresponding to a second time interval.

8. The system of claim 7 wherein said means for identifying further comprises means for applying a contact motion model to said contact paths, said means for applying producing a path likelihood vector containing a likelihood measure for said contact path.

9. The system of claim 8 wherein said means for analyzing comprises means, connected to receive said path likelihood vector, for generating an estimate of the contact state.

* * * * *